Figure 1:
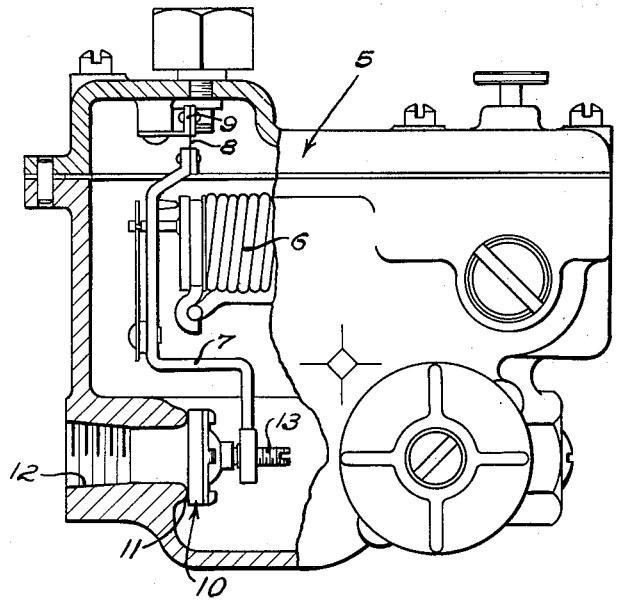

Jan. 5, 1960 E. E. MEUSY 2,919,884
VALVE
Filed Dec. 4, 1953

INVENTOR.
Eugene E. Meusy
BY
Seegert & Schwalbach
Att'ys

United States Patent Office 2,919,884
Patented Jan. 5, 1960

2,919,884

VALVE

Eugene E. Meusy, Milwaukee, Wis., assignor to Baso Inc., Milwaukee, Wis., a corporation of Wisconsin Application December 4, 1953, Serial No. 396,259

4 Claims. (Cl. 251—86)

This invention relates to improvements in valves and more particularly to an improved valve member and mounting therefor.

It has been standard practice in the past to provide a pivotal connection between a valve member and the stem or arm on which it is mounted so that when the valve member is moved to closed position it can adjust itself to the valve seat. This is particularly desirable where the valve member is carried by a swinging arm. In prior art devices, particularly in valves having low sealing forces, certain valve members have been found to wedge or lock in partially open or unsealed condition. This is obviously a dangerous situation, particularly when the fluid controlled by the valve is gaseous fuel.

It has been found that one of the factors contributing to the aforementioned wedging of a valve member in partially open or unsealed condition is the location of the pivotal mounting for said valve member at too great a distance from the plane of the sealing surface of said valve member. A relationship of this type requires the valve facing to be wiped laterally over the valve seat to too great an extent during closure, and tends to cause locking forces to be set up, said forces causing the valve seat to dig into the valve member facing and prevent further lateral wiping movement of the valve member. As a result, the valve member becomes locked in open position.

In the case of valves for the operation of which there is only a limited amount of power available, for example thermoelectrically powered valves, an additional problem presents itself, namely that of backlash or lost-motion in the valve member mounting. In valves of the aforementioned type, where the range of valve member movement is usually small, it is of utmost importance that all backlash be eliminated in order to obtain maximum valve movement. The presence of backlash has a substantial and adverse effect on the capacity as well as the efficiency of valves of this type, and it is therefore important that any pivotal valve mounting be free from such backlash.

It is a general object of the present invention to provide an improved valve member and mounting therefor which is so constructed that proper seating of the valve member on the valve seat is at all times insured.

Another object of the invention is to provide an improved valve member and mounting therefor in which the pivot point for the valve member is located in close proximity to the plane of the sealing surface of the valve member facing, so that on closure, the valve member does not wipe laterally over the valve seat to an objectionable extent, nor does it produce friction which otherwise prevents proper closure and fluid tight sealing of the valve. More particularly, forces tending to cause wedging of the valve member in partially open or unsealed condition are avoided.

Another object of the invention is to provide an improved valve member and mounting therefor in which pivotal movement of the valve member is accomplished without backlash or lost-motion which might tend to reduce the efficiency or the capacity of the valve.

Another object of the invention is to provide an improved valve member and mounting therefor which does not require high seating forces for proper seating of the valve member, and is therefore particularly well adapted for use in applications where the fluid pressures are of a relatively low order.

Another object of the invention is to provide an improved valve member of the character described having a facing of resilient material bonded thereto, said material being tough enough to resist penetration, yet resilient enough to effect sealing engagement with a valve seat at low sealing pressures, the structure of the valve member being such as to permit grinding of the valve facing to a smooth flat surface.

Another object of the invention is to provide an improved valve member and mounting therefor which is inexpensively constructed of a relatively small number of parts, most of which can be fabricated from stampings, thereby rendering the invention well adapted for mass production manufacture.

Other objects and advantages of the invention will become apparent as the description proceeds, reference being had to the accompanying drawing illustrating one complete embodiment of the preferred form of the invention.

Figure 2:
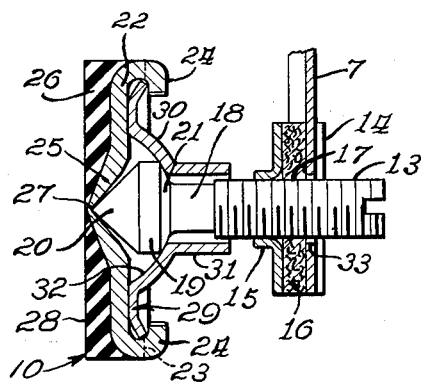

In the drawing:

Figure 1 is a side elevational view, partly in section, showing the improved valve member and mounting therefor embodied in an electromagnetically operated valve; and Figure 2 is an enlarged, fragmentary, vertical sectional view of the improved valve member and mounting therefor.

Referring more particularly to Figure 1 of the drawing, the numeral 5 indicates an electromagnetically operated valve having an electromagnetic operator 6 including an irregularly shaped valve arm 7. The upper end of the arm 7 is fixed to a leaf spring 8 which in turn is fixed at its upper end to a stationary bracket 9. The spring member 8 affords a pivot for the arm 7 so that said arm is capable of swinging movement. The improved valve member 10 is carried by a valve stem 13 at the free end of the arm 7, and is moved by swinging movement of said arm toward and away from an annular valve seat 11 to control the flow of fluid through an outlet 12.

Referring to Figure 2, the arm 7 may be channel shaped in cross-section and may be formed with an aperture 33 through which the stem 13 projects as shown. In the illustrated embodiment, the valve stem 13 is externally threaded and is connected to the arm 7 by mounting means comprising a bracket 14 which is generally C-shaped in transverse section and clampingly engages the arm 7. The bracket 14 has an internally threaded tubular portion 15 in which the stem 13 is threadedly engaged. A friction washer 16 of any suitable elastic material, preferably a synthetic linear superpolymer of a diamine and a dibasic acid, a commercial example of which is nylon, is confined between the bracket 15 and the arm 7 as shown. The washer 16 is provided with a bore 17 of restricted diameter such that it exerts sufficient friction on the stem 13 to lock the latter in a selected position of adjustment.

The valve stem 13 is further provided with a portion of reduced diameter 18 as well as a portion of enlarged diameter 19. Outwardly of the enlarged portion 19, the stem 13 is provided with a conical end portion 20 which terminates in a pointed tip. Between the portion 19 and the portion 18, the stem 13 is formed with an annular convex surface portion 21, the center of curvature of which is the tip of the conical end portion 20.

The improved valve member 10 comprises a substantially flat circular valved disk 22 which may take the form of a metal stamping having an axially directed annular peripheral flange 23 provided with a plurality of lugs 24, preferably four in number. A layer of resilient facing material 26 is chemically bonded or otherwise suitably fixed to the face of the valve disk 22 opposite the side toward which the flange 23 is directed. The facing material 26 must be hard enough to resist penetration, yet resilient enough to effect a sealing engagement with the valve seat 11 under low sealing pressures. One material which has worked satisfactorily as a facing for the valve member 10 is Buna N type synthetic elastomeric material having a durometer A scale hardness of 55 to 65. The valve disk 22 is also formed with a central conical offset 25 which projects into the facing material 26 as shown, so that the inner apex 27 of said offset is disposed in close proximity to the sealing surface 28 of the facing material 26. As shown, the wall thickness of the valve disk 22 is substantially diminished at the apex 27, as by coining of the metal at this point. The point of the conical stem portion 20 is seated in the inner apex 27 as shown, and said stem portion preferably has an angularity smaller than that of the inner surface of the conical offset 25, so that the valve member can fulcrum about point of engagement of the stem tip with the apex 27.

An annular hub member 29, which may also take the form of a metal stamping, coaxially abuts the valve disk 22 on the side opposite the facing material 26, and the lugs 24 are turned radially inwardly around the peripheral portions of said hub member to lock the latter to the valve disk in coaxial relationship. The illustrated hub member 29 has a concavo-convex central portion 30 provided with a tubular portion 31 through which the portion 18 of the stem 13 extends. The hub 29 has an inner concave surface 32 which slidably overlaps the convex surface portion 21 of the stem 13 and holds the tip of the stem 13 seated in the offset apex 27. The center of curvature of the surface 32 is the tip of the conical stem portion 20, and hence the concave surface 32 conforms to the curvature of the convex surface 21 and has a close fitting, smooth-sliding fit on said surface during pivotal movement of the valve disk 22 about the fulcrum point at said tip. The closeness of the fit between the surfaces 21 and 32 and maintenance of the stem tip seated in the apex 27 prevents any objectionable backlash between the valve member 10 and the stem 13 without impairment of the pivotal movement of said valve member. The tubular portion 31 is slightly larger in diameter than the stem 13, and engagement of its outer end with the stem 13 defines the limit of pivotal movement of said valve member in a given direction.

The provision of the conical offset 25 projecting into close proximity with the sealing surface of the facing material 26 permits the fulcrum at the apex 27 to also be disposed in close proximity to the sealing surface 28. By coining the metal of the valve disk 22 at the apex 27, the spacing between the sealing surface 28 and said apex is still further reduced. Bonding of the facing material to the disk 22 permits a flat sealing face 28 and makes possible accurate grinding of the surface 28 to the desired smoothness, which, along with the improved sealing qualities of the facing material, insures proper sealing action.

As a result of the novel construction of the improved valve, the latter, on closure, has very little or substantially no lateral wiping action over the valve seat 11. The valve member 22 upon closure at all times seals properly, even when the closing forces are of a low order, for example the 15 grams normally present in the operator illustrated when said operator is used with gaseous fuel. The absence of backlash in the improved structure insures that all movement of the stem 13 is transmitted to the valve member, with the result that maximum efficiency is at all times maintained. The relatively small number of parts in the improved valve, and the fact that a number of said parts can be fabricated from stampings, renders said valve susceptible of relatively inexpensive manufacture by mass production methods.

The specific illustrations and corresponding description are used for the purpose of disclosure only and are not intended to impose unnecessary limitations on the claims, or to confine the patented invention to a particular use. Various changes and modifications may be made without departing from the spirit of the invention, and all such changes are contemplated as may come within the scope of the claims.

What is claimed as the invention is:

1. In combination, a pivotally mounted arm, a valve stem mounted upon and generally perpendicular to said arm, a valve disk, a layer of resilient material overlaying and bonded to one side of said valve disk and having a substantially flat sealing face for cooperation with an annular valve seat, the other side of said valve disk having a conical recess formed with an apex in close proximity to the plane of said sealing face, said valve stem having a conical end portion of smaller angularity than said conical recess and terminating in an apex disposed in bearing engagement with the apex of said recess to form a fulcrum for said disk in close proximity to the plane of said sealing face, an annular arcuate surface on said stem facing away from said end portion, and a hub mounted on said disk having an arcuate surface slidably overlapping the arcuate surface of said stem to hold the apex of said conical end portion of said stem in bearing engagement with the apex of said recess while permitting pivotal movement of said disk relative to said stem, said disposition of said fulcrum relative to said sealing face affording ready accommodation of said valve disk to said seat and reduced lateral sliding movement of said sealing face on said seat upon movement of said arm.

2. In combination, a pivotally mounted arm, a valve stem mounted upon and generally perpendicular to said arm, a valve disk having a substantially flat sealing face overlaying and bonded to said disc for cooperation with an annular valve seat, said valve disk having a conical recess formed with an apex substantially in the plane of said sealing face, said valve stem having a conical end portion terminating in an apex disposed in bearing engagement with the apex of said recess to form a fulcrum for said disk substantially in the plane of said sealing face, the thickness of said disk being substantially reduced at said apex to minimize the spacing between said fulcrum and the sealing face of said disk, a hub mounted on said disk, and cooperating shoulders on said stem and hub holding the apex of said conical end portion of said stem in bearing engagement with the apex of said recess while permitting pivotal movement of said disk relative to said stem, said disposition of said fulcrum relative to said flat face affording ready accommodation of said valve disk to said seat and reduced lateral sliding movement of said flat face on said seat.

3. In combination, a pivotally mounted arm, a valve stem mounted upon and generally perpendicular to said arm, a valve disk having a plurality of peripheral lugs, a member formed of resilient material on said valve disk and having a substantially flat sealing surface for cooperation with an annular valve seat, said valve disk having a conical recess formed with an apex in close proximity to the plane of said sealing face, one end of said valve stem having a conical end portion of smaller angularity than said conical recess and terminating in an apex disposed in bearing engagement with the apex of said recess to form a fulcrum for said disk in close proximity to the plane of said sealing face, an annular shoulder on said valve stem facing away from the end portion thereof, and a circular hub member coaxial with said disk, the lugs on said valve disk overlapping the peripheral portions of said hub member to connect said hub member to said disk, said hub member having an apertured concave surface portion to which said stem projects, said concave portion slidably overlapping said stem shoulder to hold the apex of said conical end portion of said stem in bearing engagement with the apex of said recess while permitting pivotal movement of said disk relative to said stem, said disposition of said fulcrum relative to said sealing surface affording ready accommodation of said valve disk to said seat and reduced lateral sliding movement of said flat surface on said seat upon movement of said arm.

4. In combination, an elongated movable arm, a valve stem mounted at one end of said arm, a valve disk, a layer of resilient sealing material bonded to said disk and having a flat sealing surface, said disk having a central portion offset into said layer and formed with a conical recess facing away from said layer, the apex of said recess being disposed substantially in the plane of said flat sealing surface, said valve stem having a conical tip terminating in an apex seated in said recess to provide a pivot point for said disk relative to said stem at the point of engagement of said apexes, and means for retaining said apexes in engagement and thereby said disk in operative position on said stem comprising a retaining member having annular shoulder means cooperable with annular shoulder means on said stem, said retaining member being provided with a peripheral flange and said disk being provided with radially projecting lugs for overlapping engagement with said peripheral flange on said retaining member to secure said retaining member to said disk.

References Cited in the file of this patent

UNITED STATES PATENTS

| | | |
|---|---|---|
| 908,139 | Ricksecker | Dec. 29, 1908 |
| 1,226,040 | Whitbeck | May 15, 1917 |
| 1,295,394 | Voorhees | Feb. 25, 1919 |
| 1,584,975 | Brenner | May 18, 1926 |
| 1,789,340 | Melling | Jan. 20, 1931 |
| 2,014,948 | McNeal | Sept. 17, 1935 |
| 2,277,750 | Enquist | Mar. 31, 1942 |
| 2,636,711 | Koons | Apr. 28, 1953 |

FOREIGN PATENTS

| | | |
|---|---|---|
| 175,708 | Great Britain | Feb. 9, 1922 |
| 27,924 | France | June 3, 1924 |